(12) United States Patent
Schwanz et al.

(10) Patent No.: US 6,637,917 B2
(45) Date of Patent: Oct. 28, 2003

(54) SIDE FLASHING LAMP

(75) Inventors: Martina Schwanz, Creuzburg (DE); Rolf Kuenstler, Eisenach (DE); Daniel Matthie, Gerstungen (DE); Markus Braeutigam, Immelborn (DE)

(73) Assignee: Fer Fahrzeugelektrik GmbH, Eisenach (DE)

( * ) Notice: Subject to any disclaimer, the term of this patent is extended or adjusted under 35 U.S.C. 154(b) by 0 days.

(21) Appl. No.: 09/969,877

(22) Filed: Oct. 4, 2001

(65) Prior Publication Data
US 2002/0057575 A1 May 16, 2002

(30) Foreign Application Priority Data

Oct. 4, 2000 (DE) .......................... 200 17 038
Dec. 4, 2000 (DE) .......................... 200 20 544

(51) Int. Cl.$^7$ ............................... B60Q 1/00
(52) U.S. Cl. .................. 362/487; 362/494; 362/531; 362/546; 362/511; 362/540; 362/543; 362/544; 362/800; 362/545; 362/140
(58) Field of Search ................. 362/487, 494, 362/531, 512, 546, 800, 511, 509, 222, 545, 540, 140, 143, 543, 544

(56) References Cited
U.S. PATENT DOCUMENTS 6,139,171 A  * 10/2000  Waldmann .................. 362/494
6,299,334 B1 * 10/2001  Schwanz et al. ............ 362/494

* cited by examiner

*Primary Examiner*—Sandra O'Shea
*Assistant Examiner*—Bertrand Zeade
(74) *Attorney, Agent, or Firm*—Sughrue Mion, PLLC

(57) ABSTRACT

A side flashing lamp (4, 4') for fitting in the cover cap (2) of an external rear view mirror (1) for motor vehicles, comprising a lamp housing having an elongate light exit opening (3) which in the installed condition extends from the outward side of the cover cap (2), which is remote from the vehicle, substantially horizontally towards the vehicle, at least one group of light sources (12) which are arranged distributed substantially uniformly along a line which in the installed condition extends substantially horizontally over the width of the light exit opening (3), and at least one optically active device (10) which focuses the light of the at least one group of light sources (12) in a main radiation direction which in the installed condition faces substantially in the direction of travel.

To ensure the required strength of light in all emission directions and to achieve a small installation depth it is provided that at least one elongate light guide (8, 8'; 18) which is substantially of the same length as the line along which said group of light sources (12) is arranged extends parallel to said line, and the light of the at least one further light source (15) is coupled into the end (14; 26) of the light guide (8, 8'; 18) closer to the vehicle, the light guide passing the light almost completely to its opposite end (16; 27) where said light is emitted in a direction extending substantially inclinedly rearwardly with respect to the direction of travel.

16 Claims, 2 Drawing Sheets

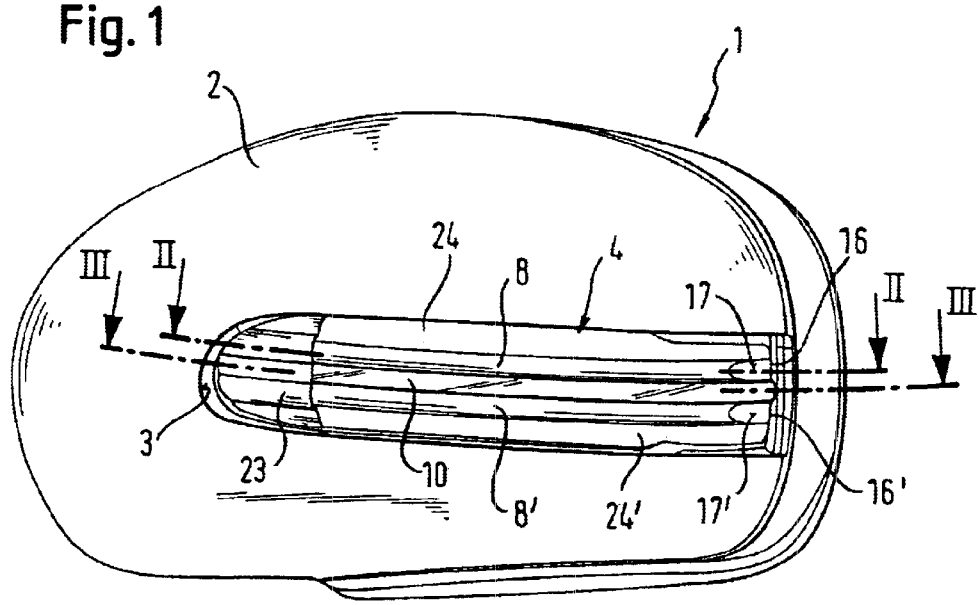
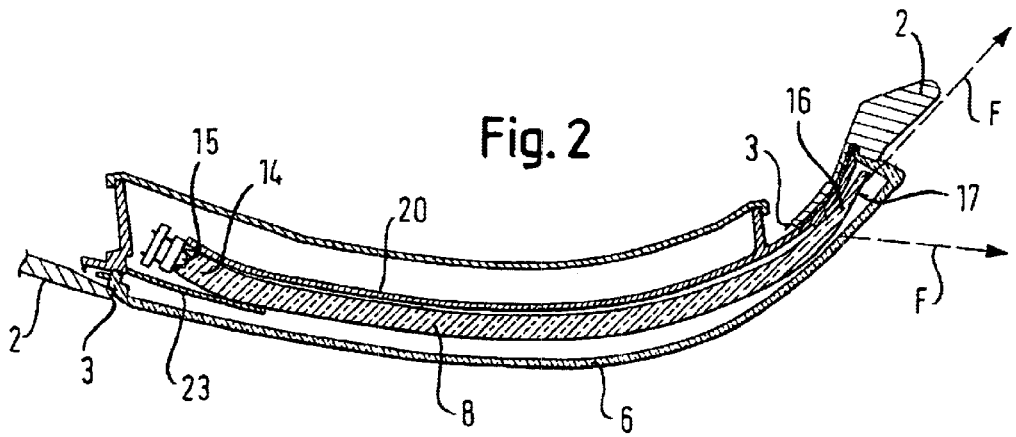
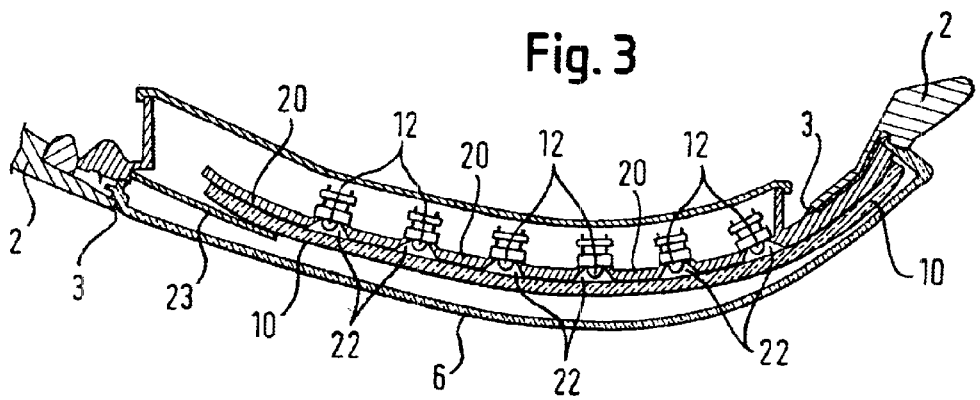

SIDE FLASHING LAMP

The invention concerns a side flashing lamp for fitting into the cover cap of an external rear view mirror for motor vehicles.

Such a side flashing lamp can be found for example in prior German patent application No. 199 33 724.1. That side flashing lamp includes a lamp housing having a light exit opening which is closed by a translucent light cover. The position of installation of the side flashing lamp in the cover cap is at the outwardly facing end of the cover cap, which is remote from the motor vehicle, while the lamp further includes a group of light sources formed by incandescent lamps, behind each of which is arranged a respective reflector and which are disposed along a line extending substantially horizontally in the installed condition in such a way that the main radiation direction of the light outputted by the incandescent lamps approximately corresponds to the direction of travel. The light cover is so shaped that it continuously continues the external contour of the cover cap, wherein, in a plan view in relation to the position of installation, the light cover is curved in such a way that it extends over an angle of about 90°, that is to say it faces with its outermost end region substantially transversely with respect to the direction of travel. Arranged there is a further incandescent lamp which has its own reflector which, in conjunction with an additionally provided prism, emits the light of that further incandescent lamp, reflected by the prism, in an angular range which faces transversely with respect to the direction of travel and inclinedly rearwardly, so that when the side flashing lamp is switched on it is also clearly visible to persons who are positioned laterally or inclinedly behind the vehicle.

A disadvantage with that known arrangement is that the incandescent lamps and the reflectors which at least partially surround same result in the side flashing lamp being of a relatively large installation depth.

EP 1 022 187 also discloses a vehicle lamp, in particular a side flashing lamp for installation in a motor vehicle external rear view mirror, in which the light cover serves as a light guide into which light from light emitting diodes or incandescent lamps is laterally coupled for the light to be emitted in a given region in space. In that case, in addition to the light emission direction prescribed by statute, light emission in the direction of travel is also something that is a desirable aspect. For that purpose, provided at the inwardly disposed rear side of the light cover in the known side flashing lamp is an optically active structure which provides that a large part of the light coupled into the light guide is emitted forwardly through the outside main surface of the light cover. The remainder of the light which is coupled into the light guide issues at the end edge of the light cover, which is in opposite relationship to the coupling-in edge, and at that emission edge is emitted in the region which is prescribed by statute. In order to achieve an adequate level of strength of light, it is necessary to use light emitting diodes which emit a very strong light and/or additional light emitting diodes which radiate light through the light guide at least approximately in the direction of travel.

SUMMARY OF THE INVENTION

In comparison therewith the object of the invention is to develop a side flashing lamp of the above-stated kind in such a way that the required level of strength of light in all desired light emission directions is ensured even when using less strong light emitting diodes and at the same time it is possible to achieve a minimum installation depth.

Accordingly, the light of at least one light emitting diode is laterally coupled into at least the one light guide which extends substantially parallel to the light cover transversely over the elongate light exit opening, and is transported by the light guide to the light coupling-out surface which is at the opposite end of the light guide. In contrast to the structure in EP 1 022 187, this light guide does not have at its rear any optically active structures which result in light being emitted in the direction of travel. This means that practically all the light which is coupled into the light guide is emitted at its coupling-out surface at the outward end thereof, into the region prescribed by statute.

The additionally desired emission of light approximately in the direction of travel is achieved by way of at least one row of light emitting diodes which are arranged directly behind a light cover and/or behind an optical element, preferably an elongate lens which is active only in the vertical direction in the position of installation and which focuses in a vertical direction the light emitted by the diodes.

That lens can either be an additional component which is arranged above or below the light guide or guides and which if desired can be formed in one piece with the light guide or guides, or it can be formed by the light guide itself which in that case also serves at the same time as a converging lens which is operative in a vertical direction.

That light emitting diode arrangement provides that the lamp is clearly visible not only in the direction which is prescribed by statute but also from the front and laterally, even when bright levels of ambient lighting strength are involved.

The installation depth of the lamp is very slight, in contrast to arrangements which involve a reflector.

These and further features and advantageous configurations of the invention are set forth in the claims.

BRIEF DESCRIPTION OF THE DRAWING

FIG. 1 is a diagrammatic perspective rear view of a motor vehicle external rear view mirror in its position of installation on the driver's side, incorporating a first embodiment of the side flashing lamp according to the invention, FIG. 2 is a view on an enlarged scale of a horizontal section of part of the external rear view mirror of FIG. 1 taken along line II—II therein, FIG. 3 is a view on an enlarged scale of a horizontal section of part of the external rear view mirror of FIG. 1 taken along line III—III therein.

DETAILED DESCRIPTION OF THE INVENTION

Figure 4:
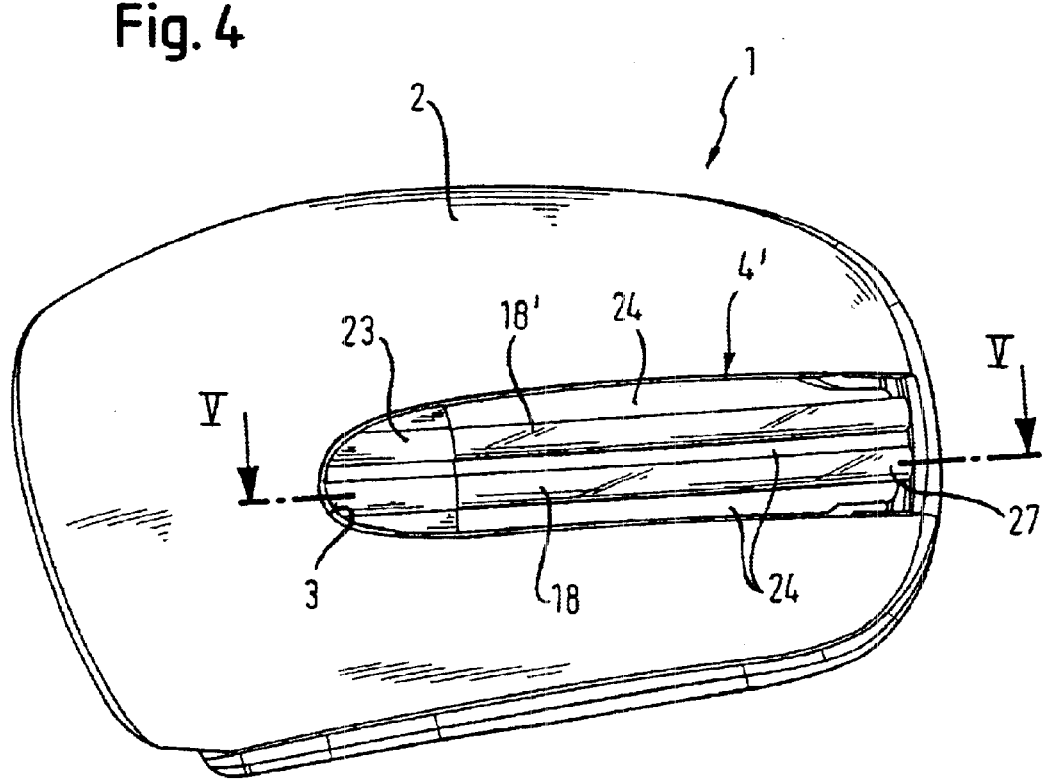
FIG. 4 is a view corresponding to FIG. 1 showing a second embodiment of the side flashing lamp according to the invention.
Figure 5:
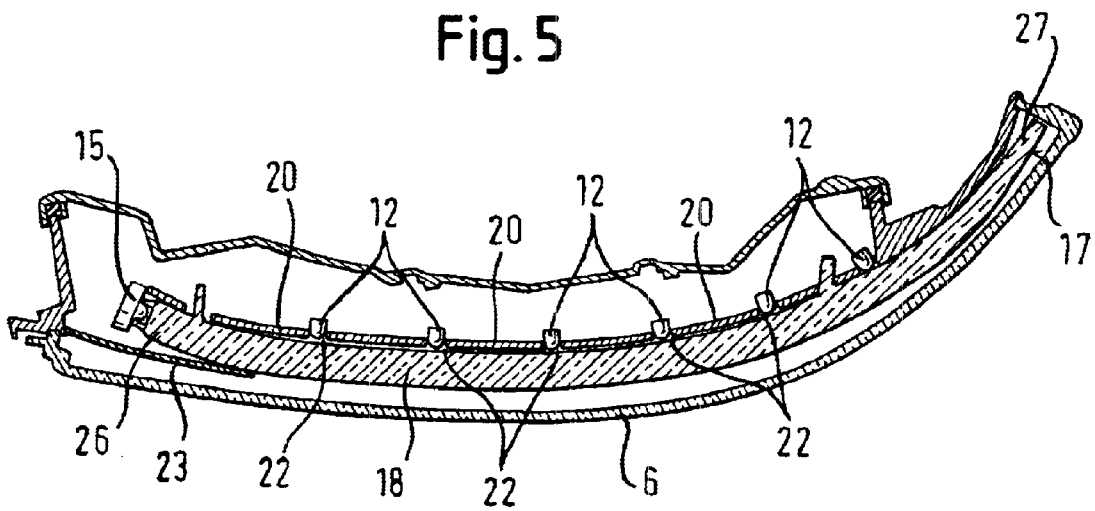
FIG. 5 is a view on an enlarged scale of a horizontal section of part of the external rear view mirror of FIG. 4 taken along line V—V therein.

FIGS. 1 and 4 each show a perspective view in the opposite direction to the direction of travel of a respective external rear view mirror 1 for motor vehicles, having a cover cap 2 with an elongate light exit opening 3 which in the installed condition extends substantially horizontally and into which is fitted from the rear a side flashing lamp 4 and 4' in accordance with the invention. The translucent light cover 6 which is shown in FIGS. 2, 3 and 5 and which closes the light exit opening 3 and which is not optically active is omitted for the sake of clarity in FIGS. 1 and 2.

As can be clearly seen from FIGS. 1 and 4, the side flashing lamps 4 and 4' according to the invention are of a generally strip-shaped structure.

In the case of the embodiment as shown in FIGS. 1 through 3, that is achieved by the provision of elongate, horizontally extending regions which are alternately different in a vertical direction. Those regions are formed by two light guides 8, 8' which are in the form of light bars, and a strip-shaped or bar-shaped lens 10 arranged therebetween. Disposed behind the lens 10 is a group of light sources 12 formed by light emitting diodes (FIG. 3). Their light which is emitted substantially in the direction of travel is caused to converge by the lens 10 in a vertical direction and is focused into a predeterminable angular region.

Looking now at FIG. 2, it can be seen therefrom that arranged at the end 14 of each bar-shaped light guide 8, 8', the end 14 being at the left in FIG. 2, is a further light emitting diode 15 which is positioned in such a way that the light that it delivers is coupled into the light guide 8, 8' and passed thereby practically completely to its oppositely disposed end 16, 16'. At that end 16, 16' each of the light guides 8, 8' is provided with a bevel 17, 17' which serves as a light coupling-out surface and the inclination of which is so selected that the light issuing therethrough is emitted into the spatial angular region which is prescribed by statute, that is to say substantially transversely with respect to the direction of travel and somewhat inclinedly rearwardly, as is indicated by the arrows F.

Arranged behind the bar-shaped light guides 8, 8' is a reflector aperture plate 20 which is continuous in a vertical direction and which is produced by vapor deposition and which, in the region of the light emitting diodes 12 arranged along a horizontal line, has openings indicated 22 (FIG. 3), through which the light emitting diodes 12 protrude. In that case each opening 22 enlarges outwardly in a frustoconical configuration away from the associated light emitting diode 12 in order in that way to form a respective small reflector.

At the side which is at the left in each of Figures, the ends of the light guides 8, 8' and of the lens 10 and also the transversely extending, strip-shaped regions 24, 24' which are disposed above the upper light guide 8 and below the lower light guide 8' are covered over by a vapor-deposited cover plate 23.

The fact that the shape of the elongate lens 10 is matched to the design of the bar-shaped light guides 8, 8' means that in the switched-off condition of the side flashing lamp the arrangement affords a uniform, regular, strip-shaped, aesthetically very attractive appearance which can be clearly perceived through the optically inactive light cover 6 which is positioned in front of the elongate lens and the light guides.

The bar-shaped light guides 8, 8' and the elongate lens 10 can be produced in the form of individual components but preferably they can be made in one piece.

In the embodiment just described hereinbefore a lens 10 is arranged between two bar-shaped light guides 8, 8'. That however is not to be interpreted as a limitation and it is possible to provide any other number of light guides and lenses which are arranged in alternate vertically superposed relationship.

In the embodiment of FIGS. 4 and 5, in which identical components are denoted by the same references as in FIGS. 1 through 3, the arrangement has two optically active, bar-shaped, substantially horizontally extending components 18, 18' which are arranged in substantially mutually parallel relationship at a vertical spacing from each other and which perform a dual function:

They serve on the one hand as bar-shaped light guides whose end 26 which is shown at the left in FIG. 5 forms the coupling-in surface by way of which light delivered by a light emitting diode 15 is coupled into the light guide in such a way that it is then transmitted practically completely to the oppositely disposed end 27 where it is emitted in the same manner as was described hereinbefore in relation to the embodiment of FIGS. 1 through 3.

On the other hand however the components 18, 18' are also in the form of converging lenses which are operative in a vertical direction and which therefore also perform the function of the above-described converging lenses 10, insofar as they cause convergence of the light from the light emitting diodes 12 arranged immediately therebehind (FIG. 5) in a vertical direction, and focus it into a predeterminable angular range.

This embodiment also includes a vapor-deposited reflector aperture plate 20 which is continuous in the vertical direction and which has openings 22 through which the light emitting diodes 12 project. This last-described embodiment is particularly advantageous for the reason that the number of components that it requires is markedly reduced in comparison with the other embodiment.

All light emitting diodes can be mounted on a flexible printed circuit board or on a stamped grid, which at the same time provides for the power supply thereto.

What is claimed is:

1. A side flashing lamp for fitting in the cover cap of an external rear view mirror for a motor vehicle, comprising a lamp housing having an elongate light exit opening which in the installed condition extends from an outward side of the cover cap, which is remote from the vehicle, substantially horizontally towards the vehicle, at least one group of light sources which are arranged distributed at least substantially uniformly along a line and which in the installed condition extend at least substantially horizontally over the length of the light exit opening, at least one optically active device which focuses the light of the at least one group of light sources in a main radiation direction which in the installed condition faces substantially in the direction of forward travel of the vehicle, at least one elongate light guide which is at least substantially of the same length as the line along which said group of light sources extends, said light guide extending parallel to said line and having a first end which is towards said vehicle in the installed condition on the vehicle, and a second end remote from the first end, and at least one further light source positioned for coupling of the light of the at least one further light source into said first end of said light guide which is thereby operable to pass said light at least almost completely to its second end where said light is emitted in a direction extending substantially inclinedly rearwardly with respect to said direction of travel, wherein the light guide is of a substantially bar-shaped configuration, and wherein said optically active device is a converging lens of a bar-shaped configuration.

2. A lamp as set forth in claim 1
wherein the light guide has a bevel at its second end.

3. A lamp as set forth in claim 1
wherein the at least one group of light sources comprises light emitting diodes.

4. A lamp as set forth in claim 1
wherein the at least one further light source is a light emitting diode.

5. A lamp as set forth in claim 1
wherein the converging lens is disposed in front of said at least one group of light sources focusing in a vertical direction light from said light sources.

6. A lamp as set forth in claim 1
wherein said light guide at the same time forms the optically active device and is arranged in front of said at least of group of light sources, said light guide being in the form of a converging lens and focusing in a vertical direction the light from the light sources.

7. A lamp as set forth in claim 1 and including
more than one said light guide.

8. A lamp as set forth in claim 1 and including
a plurality of groups of said light sources, which groups are arranged distributed substantially uniformly along respective lines, said lines extending in at least substantially mutually parallel relationship.

9. A lamp as set forth in claim 5 including
a plurality of said light guides; and
at least one converging lend arranged in front of said light sources, the light guides and the converging lens being arranged alternately in a vertical direction and in immediately mutually adjoining relationship and each being of at least substantially the same height.

10. A lamp as set forth in claim 5 including
a plurality of said light guides, and
a plurality of converging lenses arranged in front of said light sources, the light guides and the converging lenses being arranged alternately in a vertical direction and in immediately mutually adjoining relationship and each being of at least substantially the same height.

11. A lamp as set forth in claim 9
wherein the light guides are in one piece with the at least one lens arranged therebetween.

12. A lamp as set forth in claim 10
wherein the light guides are in one piece with the lenses.

13. A lamp as set forth in claim 1 and including
a vapor-deposited reflector aperture means arranged between the light sources and behind said light guide.

14. A lamp as set forth in claim 1
wherein said light guide at its second end is also operable to emit light from said further light source in a direction facing rearwardly with respect to the direction of travel.

15. A lamp as set forth in claim 1 and including
a translucent light cover which covers the light exit opening and which is arranged in front of said at least one elongate light guide and said at least one optically active device.

16. A motor vehicle external rear view mirror assembly including
a mirror housing for accommodating a mirror, and
a side flashing lamp in the mirror housing comprising
a lamp housing having an elongate light exit opening which in the installed condition extends from an outward end of the cover cap, which is remote from the vehicle, substantially horizontally towards the vehicle,
at least one group of light sources which are arranged distributed at least substantially uniformly along a line and which in the installed condition extend at least substantially horizontally over the width of the light exit opening,
at least one optically active device which focuses the light of the at least one group of light sources in a main radiation direction which in the installed condition faces substantially in the direction of forward travel of the vehicle,
at least one elongate light guide which is at least substantially of the same length as the line along which said group of light sources extends, said light guide extending parallel to said line and having a first end which is towards said vehicle in the installed condition on the vehicle, and a second end remote from the first end, and
at least one further light source arranged for coupling of the light of the at least one further light source into said first end of said light guide which is thereby operable to pass said light at least almost completely to its second end where said light is radiated in a direction extending substantially inclinedly rearwardly with respect to said direction of travel.

* * * * *